United States Patent
Heitmann et al.

(10) Patent No.: US 9,253,244 B1
(45) Date of Patent: Feb. 2, 2016

(54) SUBSCRIPTION BASED POLLING FOR RESOURCE UPDATES

(71) Applicant: AMAZON TECHNOLOGIES, INC., Reno, NV (US)

(72) Inventors: John Walter Heitmann, Seattle, WA (US); Brian Scott Cripe, Seattle, WA (US); Cory Kendall, Seattle, WA (US); Viraj Vijay Sanghvi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 287 days.

(21) Appl. No.: 13/922,734

(22) Filed: Jun. 20, 2013

(51) Int. Cl.
    *G06F 15/173* (2006.01)
    *H04L 29/08* (2006.01)
    *H04L 12/18* (2006.01)
    *H04L 29/06* (2006.01)
    *H04L 29/12* (2006.01)

(52) U.S. Cl.
    CPC ............... *H04L 67/02* (2013.01); *H04L 67/14* (2013.01); *H04L 12/1822* (2013.01); *H04L 29/06176* (2013.01); *H04L 29/06319* (2013.01); *H04L 29/06326* (2013.01); *H04L 29/08576* (2013.01); *H04L 61/3085* (2013.01); *H04L 65/1066* (2013.01)

(58) Field of Classification Search
    CPC ............. H04L 41/0609; H04L 12/1822; H04L 29/06319; H04L 29/06326; H04L 29/08576; H04L 29/06176; H04L 61/3085; H04L 67/14; H04L 65/1066
    See application file for complete search history.

(56) References Cited

U.S. PATENT DOCUMENTS

| | | | |
|---|---|---|---|
| 2007/0224978 | A1 | 9/2007 | Wherry et al. |
| 2007/0245409 | A1* | 10/2007 | Harris et al. ............... 726/5 |
| 2015/0089061 | A1* | 3/2015 | Li et al. ............... 709/226 |

* cited by examiner

*Primary Examiner* — Krisna Lim
(74) *Attorney, Agent, or Firm* — Lindauer Law, PLLC

(57) ABSTRACT

Techniques are described for updating resources provided to a user device, using subscription based polling. A user device may send initial requests for resource to a server, each initial request including a resource identifier and a subscriber identifier. In some cases, the subscriber identifier may uniquely identify the communication session. The server maintains subscription information correlated with the subscriber identifier, the subscription information listing which resources the user device has requested and which versions of the resources are currently available on the user device. Updates to the subscribed resources may then be provided to the user device in response to a request for updates that specifies the session identifier but that may not specify the particular subscribed resources.

20 Claims, 11 Drawing Sheets

INITIAL VERSION OF RESOURCE 124 — Levin signed and made no reply. He was thinking of his own affairs and not listening to Oblonsky.
And suddenly both of them felt that though they were friends and had dined and drunk wine together, which should have drawn them closer still, each was thinking only of his own affairs and was not concerned with the other. Oblonsky had experienced before this feeling of estrangement instead of rapprochement after dining with a friend, and knew what to do in such circumstances.

+

INCREMENTAL RESOURCE UPDATE 122 — ~~made no reply~~ did not answer.

~~And suddenly both of them felt that~~ Al suddenly both of them felt that

↓ OPERATIONS APPLYING UPDATE(S) TO RESOURCE 702

UPDATED VERSION OF RESOURCE 204 — Levin signed and did not answer. He was thinking of his own affairs and not listening to Oblonsky.
Although they were friends and had dined and drunk wine together, which should have drawn them closer still, suddenly both of them felt that each was thinking only of his own affairs and was not concerned with the other. Oblonsky had experienced before this feeling of estrangement instead of rapprochement after dining with a friend, and knew what to do in such circumstances.

FIG. 7

SUBSCRIPTION BASED POLLING FOR RESOURCE UPDATES

BACKGROUND

The World Wide Web has evolved and expanded to become nearly ubiquitous, and users increasingly turn to the web to find information regarding many aspects of their daily life. Given this ever increasing usage, web application designers seek ways to deliver content more quickly and efficiently, and to provide greater usability in their web applications. Content delivery may be particularly challenging in scenarios where a large number of content items are presented through a web application or in situations where large numbers of content items are frequently updated to users.

BRIEF DESCRIPTION OF THE DRAWINGS

FIG. 7 depicts an example of an incrementally updated resource that may be provided by the resource server device to the user device.

Figure 1:
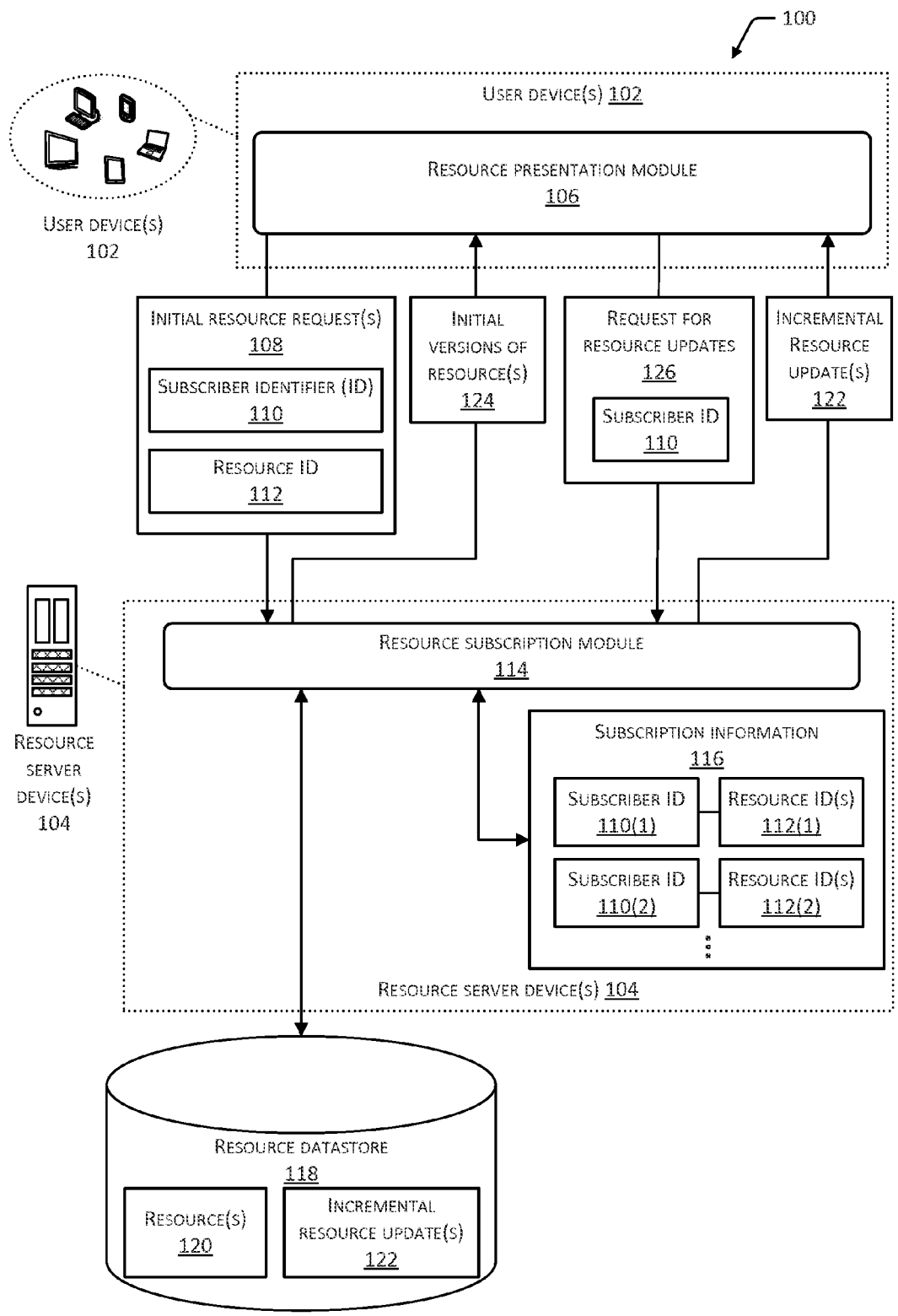
FIG. 1 depicts an environment including one or more user devices requesting resources, and one or more resource server devices that determine resource subscriptions, provide initial versions of the subscribed resources, and provide incremental updates of the subscribed resources.

Certain implementations and embodiments are described in more detail with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for providing updates to previously provided resources based on subscription information that identifies the previously provided resources. As used herein, a resource may refer to at least a portion of a document, at least a portion of a file, or other data that may be provided for presentation on a user device. In some cases, a resource may be a content item that is provided to a user device and that is configured to be presented in a web application that is executing within a web browser on the user device. However, implementations are not limited to web content, and support other types of resources.

As described further herein, a user device may send one or more requests to a resource server device, requesting one or more resources to be presented on the user device. Each such initial resource request may include a subscriber identifier (ID) and a resource ID that distinguishes the resource, such as a Uniform Resource Identifier (URI), Uniform Resource Locator (URL), or Uniform Resource Name (URN). In some implementations, the subscriber ID may uniquely identify, or may otherwise correspond to, the communication session between the user device and the resource server device. The resource server device may send, in response to the request(s), an initial version of each of the requested resources. The resource server device may also update subscription information that tracks each of the resources requested by the user device. In some implementations, the subscription information may be associated with the subscriber ID, and may include one or more resource subscriptions identifying resources previously requested by the user device. Each resource subscription may include the resource ID and a version indicator describing which version of the resource has been most recently sent to the user device. Accordingly, the resources tracked in the subscription information may be described as subscribed resources, which are subscribed to by the user device during a communication session corresponding to the subscriber ID. Any number of resources may be subscribed to by the user device during a communication session. In some cases, between 50 and 100 resources may be requested by a user device, and subscribed to by the user device, during a communication session.

After receiving the initial versions of the requested resources, the user device may send a request for updates to the resource server device. The request for updates may specify the subscriber ID. In some implementations, the request for updates may not describe any of the particular subscribed resources previously sent to the user device. In response to the request for updates, the resource server device may send updated information describing updates to one or more of the subscribed resources. In some implementations, the update information for a subscribed resource may include incremental resource updates that describe changes to the subscribed resource relative to a previous version of the subscribed resource.

In implementations, the subscription information includes a list, table, or other type of data structure that describes the subscribed resources that have been requested by a user device during a communication session. The subscription information may also indicate the versions of the subscribed resources last provided to the user device. Because the subscription information is stored on the resource server device, the user device need not keep track of which resources it has requested and which versions of those resources it currently has stored in memory. In traditional long polling techniques, after an initial page display a client may poll the server for updates by sending a request that lists each of the previously requested resources. This technique may become increasingly unwieldy as the number of requested resources increases, given that the client may need to remember which resources it has previously requested. In contrast to traditional long polling, implementations described herein provide for a request for updates that does not specify the particular resources for which the user device is requesting updates, given that the particular resources are tracked on the server device. By tracking subscribed resources on the server device, implementations may enable thinner, simpler, and more reliable applications to execute on the user device, and may enable more complex application interactions with a larger number of possibly changing resources.

FIG. 1 depicts an environment 100 including one or more user devices 102 requesting resources, and one or more resource server devices 104 that determine resource subscriptions, provide initial versions of the subscribed resources, and provide incremental updates of the subscribed resources. The user device(s) 102 may include any type of computing device, including, but not limited to, a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the user device(s) 102 is described further with reference to FIG. 3. The resource server device(s) 104 may include any type of computing device, including, but not limited to, a desktop computer, a personal computer, a mainframe computer, a server computer, a network computer, a cloud computing device, and so forth. An example of the resource server device(s) 104 is described further with reference to FIG. 4.

The user device(s) 102 may execute a resource presentation module 106. The resource presentation module 106 may enable a user to request one or more resources from the resource server device(s) 104, and may present the resources received in response to such requests. In some implementations, the resource presentation module 106 may include a web application that is executed within a web browser that is running on the user device 102. As used herein, a web application may include any application that is configured to execute within a web browser. Implementations support any web browser, including, but not limited to, Mozilla® Firefox®, Microsoft® Internet Explorer®, Google® Chrome®, Apple® Safari®, or Rockmelt®. A web application may be implemented in one or more markup languages including any version of Hypertext Markup Language (HTML), Extensible HTML (XHTML), Dynamic HTML (DHTML), Extensible Markup Language (XML), and so forth. A web application may also include functionality that is implemented using a programming language, such as JavaScript, Objective-C, Perl, VBScript, and so forth.

A user may employ the resource presentation module to generate one or more initial resource request(s) 108, which are sent to the resource server device(s) 104. Each of the initial resource request(s) 108 may include a subscriber ID 110 and a resource ID 112. In some implementations, the resource ID 112 may include a URI, such as a URL or a URN. The resource ID 112 may provide a location where a resource is stored, or a location where a resource may be accessed by a process. In some cases, the resource ID 112 may uniquely identify or distinguish the resource.

In some implementations, the subscriber ID 110 may identify or otherwise correspond to a communication session between the user device 102 and the resource server device 104, such as the communication session through which the initial resource request(s) 108 are communicated. In some implementations, the communication session may be an HTTP session between the user device 102 and the resource server device 104, and the subscriber ID 110 may be an HTTP session identifier. Alternatively, the subscriber ID 110 may identify or otherwise correspond to the user device 102, or a user of the user device 102. In some implementations, the subscriber ID 110 included in the initial resource request 108 may uniquely correspond to the communication session, the user device 102, or a user.

In some implementations, the initial resource request 108 may be an HTTP request or command such as an HTTP GET, POST, PUT, and so forth. For example, an initial resource request 108 may be as follows:

GET http://issues.xyz123.com/issues/adsf?sessionID=2

In this example, the resource ID 112 is the URL "issues.xyz123.com/issues/adsf" and the subscriber ID 110 is "2". In this example, the subscriber ID 110 is specified as an HTTP parameter "sessionID" appended to the URL for the resource ID 112. Implementations may incorporate the subscriber ID 110 into the initial resource request 108 as an HTTP parameter (as in the example above), an HTTP header, an HTTP cookie, in the payload of an HTTP request such as an HTTP GET, or through other means.

An HTTP header describes data that is included in an HTTP request or an HTTP response, following the first line of the HTTP request or the HTTP response. The HTTP header may include any number of fields that describe operating parameters of an HTTP transaction, such as that between the user device 102 and the resource server device 104. An HTTP parameter describes a portion of a query string that may be appended to a URL in an HTTP request, in some cases following a separator character such as the "?" character in the example above. An HTTP cookie describes data that is stored in memory on a client device (e.g., the user device 102), and that is retrieved by a web application executing on a server device (e.g., the resource server device 104) when the client device interacts with the web application. In some cases, the HTTP cookie may be incorporated into an HTTP header of a request.

Although examples herein describe the subscriber ID 110 as including application protocol (e.g., HTTP) information for the initial resource request 108 or the request for resource updates 126, implementations are not so limited. Implementations also support a subscriber ID 110 that comprises information associated with communication protocols at other layers of the Open Systems Interconnection (OSI) model. In some cases, the subscriber ID 110 may include information associated with a protocol at the transport layer, such as any version of the Transmission Control Protocol (TCP) or the User Datagram Protocol (UDP). The subscriber ID 110 may also include information associated with a protocol at the internet layer, such as any version of the Internet Protocol (IP). For example, the subscriber ID 110 may include an IP address of the user device 102.

The initial resource request(s) 108 may be received by a resource subscription module 114 executing on the resource server device(s) 104. Operations of the resource subscription module 114 are described further with reference to FIGS. 8-11. For each initial resource request 108, the resource subscription module 114 may modify subscription information 116 to include a resource subscription that describes the requested resource. The subscription information 116 is described further with reference to FIGS. 5 and 6. In some implementations, the subscription information 116 may include one or more resource subscriptions associated with the subscriber ID 110. Each resource subscription may include the resource ID 112 that distinguishes the subscribed resource, and may also include a version indicator that indicates which version of the subscribed resource was most recently sent to the user device 102.

The resource subscription module 114 may access a resource datastore 118. The resource datastore 118 may store one or more resource(s) 120, and one or more incremental resource update(s) 122. In implementations corresponding to FIG. 1, the resource(s) 120 stored in the resource datastore 118 may include baseline versions of each of the stored resources 120. The incremental resource update(s) 122 may each describe one or more changes or deltas relative to a corresponding baseline version of a resource 120. Accordingly, a current version of a particular resource 120 may be determined by combining, integrating, or otherwise incorporating one or more incremental resource updates 122 into an associated baseline version of a resource 120, as illustrated by the example of FIG. 7.

The resource datastore 118 may include any number of data storage systems that employ any type of data storage technology. The resource datastore 118 may include a relational datastore that employs a relational storage format including one or more formally described tables, each table including one or more columns associated with data attributes. The resource datastore 118 may include a non-relational datastore, such as an hierarchical database, a network database, a key-value datastore, a hash table, a flat file, an associative array, and so forth.

The resource datastore 118 may include, but is not limited to, data storage systems managed through any of the following: Oracle® and MySQL®, from Oracle Corporation® of Redwood City, Calif.; DB2®, from International Business Machines® (IBM) Corporation of Armonk, N.Y.; Linter®, from the RELEX Group® of Voronezh, Russia; FoxPro® database management system, Microsoft Access®, and Microsoft SQL Server®, from Microsoft Corporation® of Redmond, Wash.; PostgreSQL®, from the PostgreSQL Global Development Group; SQLite®, from D. Richard Hipp; ParAccel® Analytic Database, from ParAccel, Incorporated® of San Diego, Calif.; and Hadoop®, from the Apache Software Foundation®.

In some implementations, the resource datastore 118 may include or be associated with an issue tracking system, and the stored resource(s) 120 may describe bug reports, issue reports, trouble tickets, and so forth. In such cases, the information stored in the resource datastore 118 may enable an organization such as an information technology group, a software development team, a data management team, a project development team, and so forth to identify, address, and resolve issues. The incremental resource update(s) 122 may include updates made by team members or other users, reflecting changes in the status of an issue. Alternatively, the resource datastore 118 may include or be associated with a source control system, such as Perforce®. In such cases, the resource(s) 120 may include source code files for implementing classes, libraries, headers, methods, and so forth, technical documentation, and other documents related to a development project. The incremental resource update(s) 122 may include check-ins to update the resource(s) 120.

For each resource requested in the initial resource request(s) 108, the resource subscription module 114 may determine an initial version of the resource 124 by combining a baseline version of the resource 120 with any incremental resource update(s) 122 that are associated with the resource 120. This initial version of the resource 124 may then be sent to the resource presentation module 106. In some implementations, the initial version of the resource 124 is the current version of the resource 120 when the resource subscription module 114 responds to or processes the initial resource request 108. The resource presentation module 106 may receive the initial version(s) of the resource(s) 124, and present them on the user device 102. Implementations support resources that include any type of document that includes any type of data in any format, or any type of unformatted data. For example, the resources may include formatted or unformatted text files, binary files, software code, audio or video data files, graphics files, image files, and so forth.

After receiving the initial version(s) of the resource(s) 124, the resource presentation module 106 may generate one or more requests for resource updates 126, and send the request(s) for resource updates 126 to the resource server device(s) 104. The request for resource updates 126 may specify the subscriber ID 110, and may not identify any of the particular resources previously sent to the user device 102. In some implementations, the request for resource updates 126 may be an HTTP request or command, such as an HTTP GET, POST, PUT, and so forth. For example, the request for resource updates 126 may be as follows:

GET http://issues.xyz123.com/events?sessionID=2

In some cases, the request for resource updates 126 may be addressed to a particular URL that has been designated by the resource server device(s) 104 as a URL for requesting updates. In this example, the request for resource updates 126 is addressed to "http://issues.xyz123.com/events" and includes the subscriber ID 110 of "2". The same subscriber ID 110 may be included in the initial resource request(s) 108 and in the request for resource updates 126.

On receiving the request for resource updates 126, the resource subscription module 114 may employ the subscription information 116 to determine one or more subscribed resources associated with the subscriber ID 110. The request for resource updates 126 may then determine whether any updates have been made to any of the subscribed resources since the initial version(s) of the resource(s) 124 were sent to the user device 102, or since the last version(s) sent to the user device 102. In implementations corresponding to FIG. 1, this determination may be based on information stored in the resource datastore 118. For example, the resource datastore 118 may store the incremental resource update(s) 122 associated with the resource(s) 120, and may include a version number, watermark, date/time stamp, or other indication of when each incremental resource update 122 was created or added to the resource datastore 118. Any incremental resource update(s) 122 that are newer than the initial version of the resource 124 may be retrieved from the resource datastore 118 and sent to the resource presentation module 106. Alternatively, in some implementations the resource server device(s) 104 may store a queue of updates made to each of the resource(s) 120, and provide the updates to the user device 102 that are more recent than the initial version of the resource 124.

In some implementations, the resources 120 may be versioned according to an order from older versions to more recent versions, or according to an ordering of their version numbers or other types of version indicators. For example, version 1.0 of a resource 120 may be older than version 1.2 of the resource, which may be older than version 2.1 of the resource, and so forth. Accordingly, a current version of a resource 120 may be generated by combining a baseline or initial version of the resource with one or more incremental updates that have been applied to the resource, by applying the updates according to the order in which they were added to the resource datastore 118.

After receiving the incremental resource update(s) 122, the resource presentation module 106 may incorporate those updates into a previously received version of the subscribed resource, such as the initial version of the resource 124. The updated resource may then be presented on the user device 102. The incremental resource update(s) 122 may include any type of change to the resource, such as additions, deletions, format changes, or other types of edits to the resource. The incremental resource update(s) 122 may apply to any portion of the resource, or to the entire resource, and any number of changes to the resource may be included in each incremental resource update 122.

After providing the incremental resource update(s) 122 to the user device 102, the resource subscription module 114 may update the subscription information 116 associated with the subscriber ID 110 to indicate that updates to the subscribed resources have been sent to the user device 102. In this way, the subscription information 116 may track the version of each subscribed resource that was last provided to the user device 102. The resource subscription module 114 may then continue to monitor for updates to the subscribed resources, and send additional updates as they are added to the resource datastore 118. In some implementations, the request for resource updates 126 remains open as an open request, or a poll, from the user device 102 requesting that the resource server device 104 continue to send resource updates shortly after they are made. In some implementations, updates may be provided at a predetermined frequency (e.g., every 60 seconds).

Figure 2:
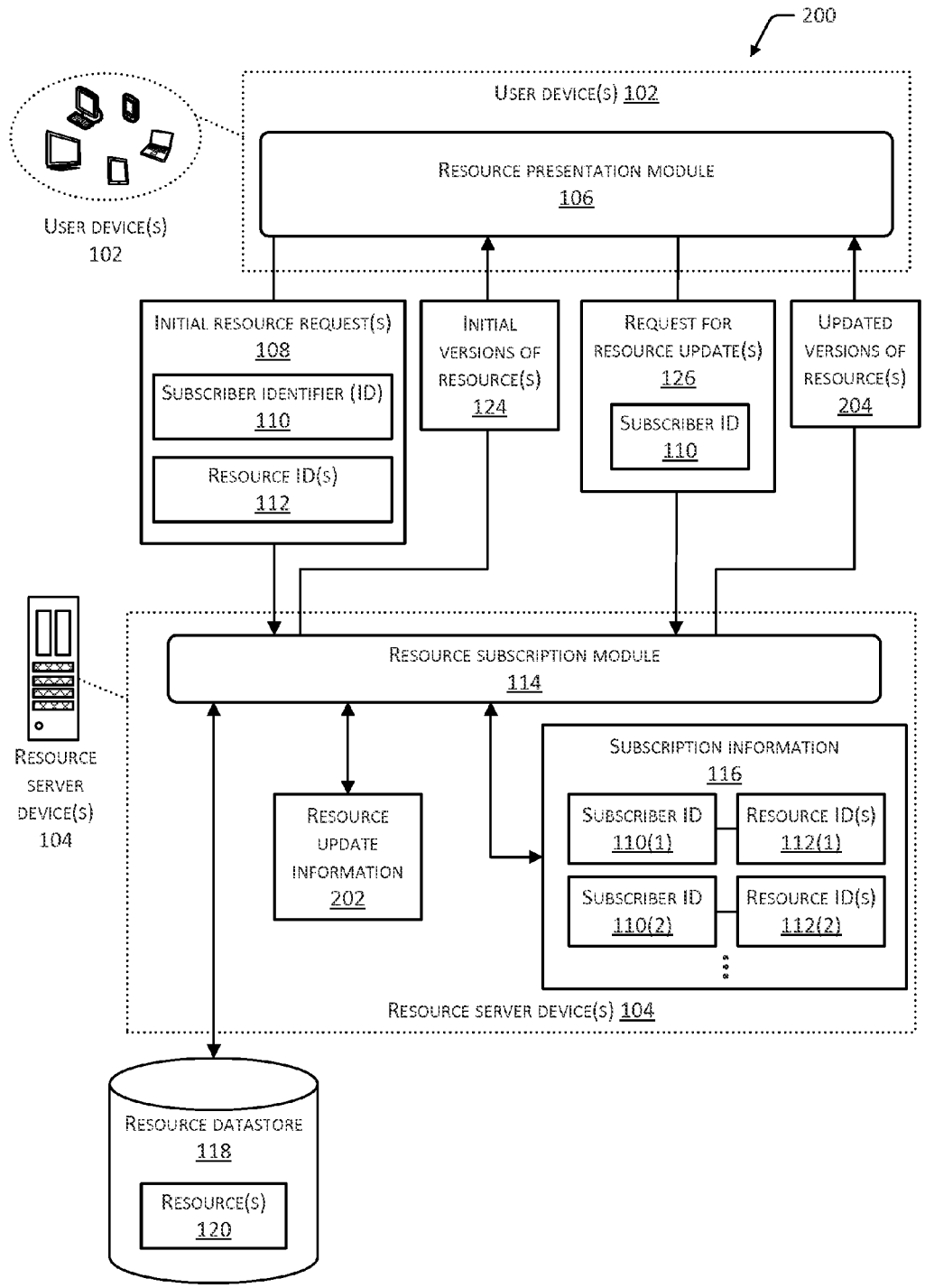
FIG. 2 depicts an environment including one or more user devices requesting resources, and one or more resource server devices that determine resource subscriptions, provide initial versions of the subscribed resources, and provide updated versions of the subscribed resources.

FIG. 2 depicts an environment 200 including the user device(s) 102 requesting resources from the resource server device(s) 104. FIG. 2 illustrates implementations in which the resource server device 104 provides updated versions of the subscribed resources to the user device 102, instead of providing incremental updates as shown in FIG. 1. Accordingly, the operations for processing the initial resource request(s) 108, providing the initial versions of the resource(s) 124, updating the subscription information 116, and processing the request for resource updates 126 may proceed similarly as described with reference to FIG. 1.

In implementations illustrated by FIG. 2, the resource server device(s) 104 may store resource update information 202. The resource update information 202 may include information describing whether the resource datastore 118 stores an updated version of each of the resource(s) 120 that is more recent than the initial versions of the resource(s) 124 previously sent to the user device 102. For example, the resource update information 202 may include a binary flag or other data indicating that a version of a resource is available that is more recent than the last version sent to the user device 102. In some implementations, the resource datastore 118 may be periodically queried or polled to determine whether updates have been made to any of the resource(s) 120 stored therein. If so, the resource update information 202 may be edited to indicate that a more recent version of one or more resources 120 is available in the resource datastore 118. In some implementations, the resource update information 202 may include a table or other data structure that lists, for each of the resource(s) 120, a version indicator identifying the version of the resource 120 currently stored in the resource datastore 118. As described above, the version indicator may include a date/time stamp, a watermark, a version number, and so forth.

In response to the request for resource updates 126, the resource subscription module 114 may check the resource update information 202 to determine which version of each subscribed resource is currently stored in the resource datastore 118. The resource subscription module 114 may then check the subscription information 116 to determine which version of each subscribed resource was last sent to the user device 102. If the current version of a subscribed resource is more recent than the last version sent to the user device 102, the resource subscription module 114 may retrieve the current version from the resource datastore 118 and send it to the user device 102 as an updated version of the resource 204.

The various devices of the environment 100 and the environment 200 may communicate with one another using one or more networks. Such networks may include public networks such as the Internet, private networks such as an institutional or personal intranet, or some combination of private and public networks. The networks may include any type of wired or wireless network, including, but not limited to, local area networks (LANs), wide area networks (WANs), wireless WANs (WWANs), wireless LANs (WLANs), and mobile communications networks (e.g. 3G, 4G, and so forth). In some implementations, communications between the various devices in the environment 100 and the environment 200 may be encrypted or otherwise secured. For example, such communications may employ one or more public or private cryptographic keys, digital certificates, or other credentials supported by a security protocol such as any version of the Secure Sockets Layer (SSL) or Transport Layer Security (TLS) protocol.

Figure 3:
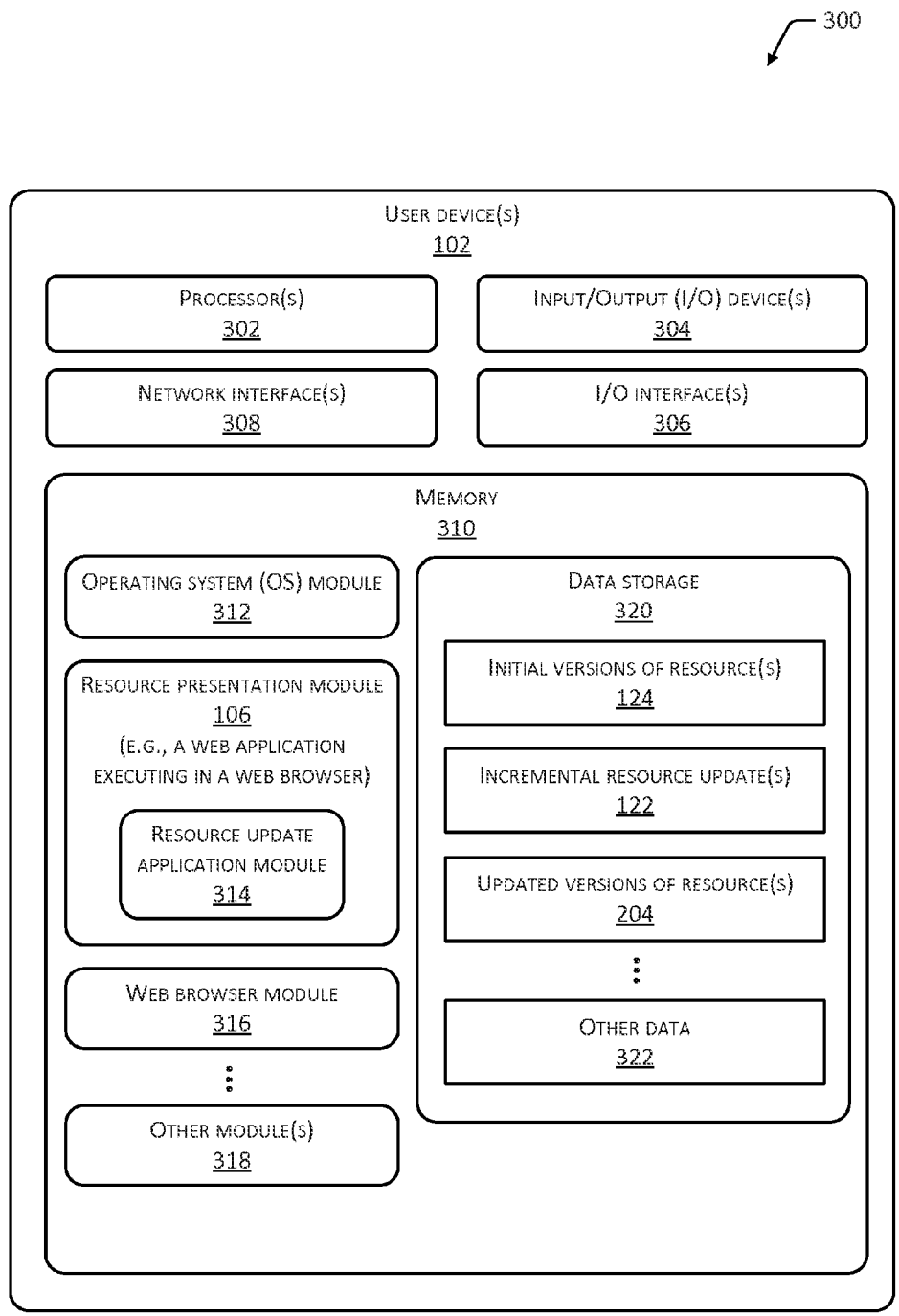
FIG. 3 depicts a block diagram of a user device that may operate to request resources from a resource server device, and present received resources and resource updates.

FIG. 3 depicts a block diagram 300 of an example of the user device 102. As shown in the block diagram 300, the user device 102 may include one or more processors 302 configured to execute one or more stored instructions. The processor(s) 302 may comprise one or more cores.

The user device 102 may include one or more input/output (I/O) devices 304. The I/O device(s) 304 may include input devices such as a keyboard, a mouse, a pen, a game controller, a touch input device, an audio input device (e.g., a microphone), an image capture device (e.g., a camera), a gestural input device, a haptic input device, or other devices. In some cases, The I/O device(s) 304 may also include output devices such as a display, an audio output device (e.g., a speaker), a printer, a haptic output device, and so forth. The I/O device(s) 304 may be physically incorporated with the user device 102, or may be externally placed.

The user device 102 may include one or more I/O interfaces 306 to enable components or modules of the user device 102 to control, interface with, or otherwise communicate with the I/O device(s) 304. The I/O interface(s) 306 may enable information to be transferred in or out of the user device 102, or between components of the user device 102, through serial communication, parallel communication, or other types of communication. For example, the I/O interface(s) 306 may comply with a version of the RS-232 standard for serial ports, or with a version of the Institute of Electrical and Electronics Engineers (IEEE) 1284 standard for parallel ports. As another example, the I/O interface(s) 306 may be configured to provide a connection over Universal Serial Bus (USB) or Ethernet. In some cases, the I/O interface(s) 306 may be configured to provide a serial connection that is compliant with a version of the IEEE 1394 standard. The user device 102 may also include one or more busses or other internal communications hardware or software that allow for the transfer of data between the various modules and components of the user device 102.

The user device 102 may include one or more network interfaces 308 that enable communications between the user device 102 and other networked devices, such as the resource server device(s) 104. The network interface(s) 308 may include one or more network interface controllers (NICs) or other types of transceiver devices configured to send and receive communications over a network.

The user device 102 may include one or more memories, described herein as memory 310. The memory 310 comprises one or more computer-readable storage media (CRSM). The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the user device 102.

The memory 310 may include an operating system (OS) module 312. The OS module 312 is configured to manage hardware resources such as the I/O device(s) 304, the I/O interface(s) 306, and the network interface(s) 308, and to provide various services to applications, processes, or modules executing on the processor(s) 302. The OS module 312 may include one or more of the following: any version of the Linux® operating system originally released by Linus Torvalds; any version of iOS® from Apple Corp.® of Cupertino, Calif., USA; any version of Windows® or Windows Mobile® from Microsoft Corp.® of Redmond, Wash., USA; any version of Android® from Google Corp.® of Mountain View, Calif., USA and its derivatives from various sources; any version of Palm OS® from Palm Computing, Inc.® of Sunnyvale, Calif., USA and its derivatives from various sources; any version of BlackBerry OS® from Research In Motion Ltd.® of Waterloo, Ontario, Canada; any version of VxWorks® from Wind River Systems® of Alameda, Calif., USA; or other operating systems.

The memory 310 may include the resource presentation module 106 described above with reference to FIG. 1. In implementations where the user device 102 receives the incremental resource update(s) 122, as in the example of FIG. 1, the resource presentation module 106 may include a resource update application module 314. The resource update application module 314 may perform operations to combine the incremental resource update(s) 122 with a previously received version of a corresponding resource, or otherwise incorporate the updates into the resource to generate an updated version of the resource.

In some implementations, the memory 310 may include a web browser module 316. The web browser module 316 may include any web browser, such as Mozilla® Firefox®, Microsoft® Internet Explorer®, Google® Chrome®, Apple® Safari®, Rockmelt®, and so forth. In some cases, the resource presentation module 106 may execute as a web application within the web browser module 316. The memory 310 may also include one or more other modules 318, such as a user authentication module or an access control module to secure access to the user device 102, and so forth.

The memory 310 may include data storage 320 to store data for operations of the user device 102. The data storage 320 may comprise a database, array, structured list, tree, or other data structure, and may be a relational or a non-relational datastore. The data storage 320 may store the one or more of the initial versions of the resource(s) 124, the incremental resource update(s) 122, or the updated version(s) of the resource(s) 204. The data storage 320 may also store other data 322, such as user authentication information or access control data. In some implementations, at least a portion of the information stored in the data storage 320 may be stored externally to the user device 102, on other devices that are accessible to the user device 102 via the I/O interface(s) 306 or via the network interface(s) 308.

Figure 4:
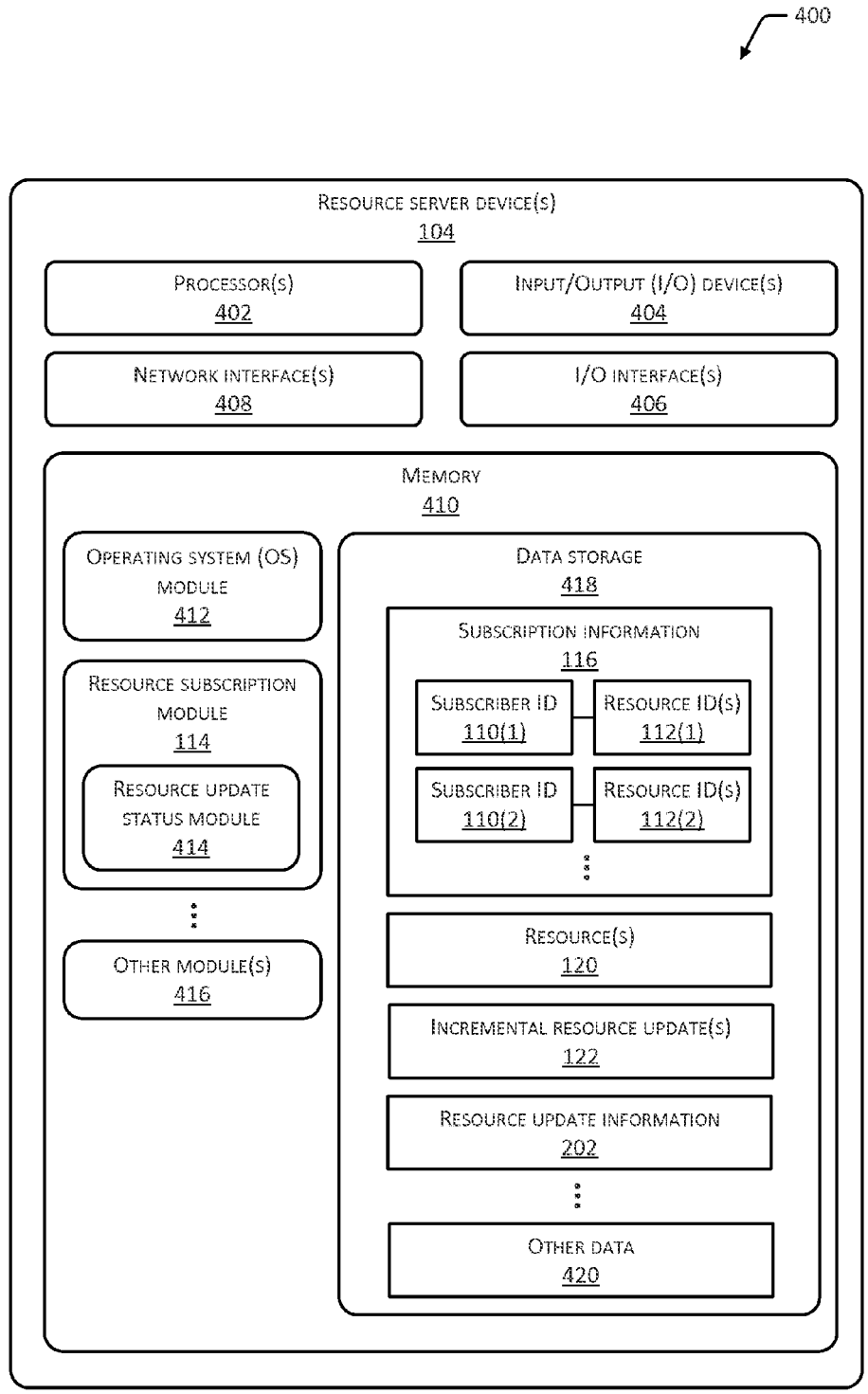
FIG. 4 depicts a block diagram of a resource server device that may operate to determine subscribed resources previously sent to a user device, and provide updates of the subscribed resources to the user device.

FIG. 4 depicts a block diagram 400 of an example of the resource server device 104. As shown in the block diagram 400, the resource server device 104 may include one or more processors 402 configured to execute one or more stored instructions. The processor(s) 402 may comprise one or more cores. The resource server device 104 may include one or more I/O devices 404, one or more I/O interfaces 406, and one or more network interfaces 408 as described above with reference to the I/O device(s) 304, the I/O interface(s) 306, and the network interface(s) 308 respectively.

The resource server device 104 may include one or more memories, described herein as memory 410. The memory 410 comprises one or more CRSM. The CRSM may include one or more of an electronic storage medium, a magnetic storage medium, an optical storage medium, a quantum storage medium, a mechanical computer storage medium, and so forth. The memory 410 provides storage of computer-readable instructions, data structures, program modules, and other data for the operation of the resource server device 104. The memory 410 may include an OS module 412. The OS module 412 is configured to manage hardware resources such as the I/O device(s) 404, the I/O interface(s) 406, and the network interface(s) 408, and to provide various services to applications, processes, or modules executing on the processor(s) 402. The OS module 412 may include one or more of the operating systems described above with reference to OS module 312.

The memory 410 may include the resource subscription module 114, which may perform operations as further described with reference to FIGS. 8-11. In implementations where the resource server device 104 stores the resource update information 202, the resource subscription module 114 may include a resource update status module 414 that maintains the resource update information 202 as described above with reference to FIG. 2. The memory 410 may also include one or more other modules 416, such as a user authentication module or an access control module to secure access to the resource server device 104, and so forth.

The memory 410 may include data storage 418 to store data for operations of the resource server device 104. The data storage 418 may comprise a database, array, structured list, tree, or other data structure, and may be a relational or a non-relational datastore. The data storage 418 may store the subscription information 116 that includes one or more resource subscriptions associated with one or more subscriber IDs 110. The subscription information 116 is further described with reference to FIGS. 5 and 6. In some implementations, the data storage 418 may store either or both of the resource(s) 120 and the incremental resource update(s) 122. Alternatively, either or both of the resource(s) 120 and the incremental resource update(s) 122 may be stored externally to the resource server device 104, in the resource datastore 118 as shown in FIGS. 1 and 2. In some implementations, the data storage 418 includes the resource update information 202. The data storage 418 may also store other data 420, such as user authentication information or access control data. In some implementations, at least a portion of the information stored in the data storage 418 may be stored externally to the resource server device 104, on other devices that are accessible to the resource server device 104 via the I/O interface(s) 406 or via the network interface(s) 408.

Figure 5:
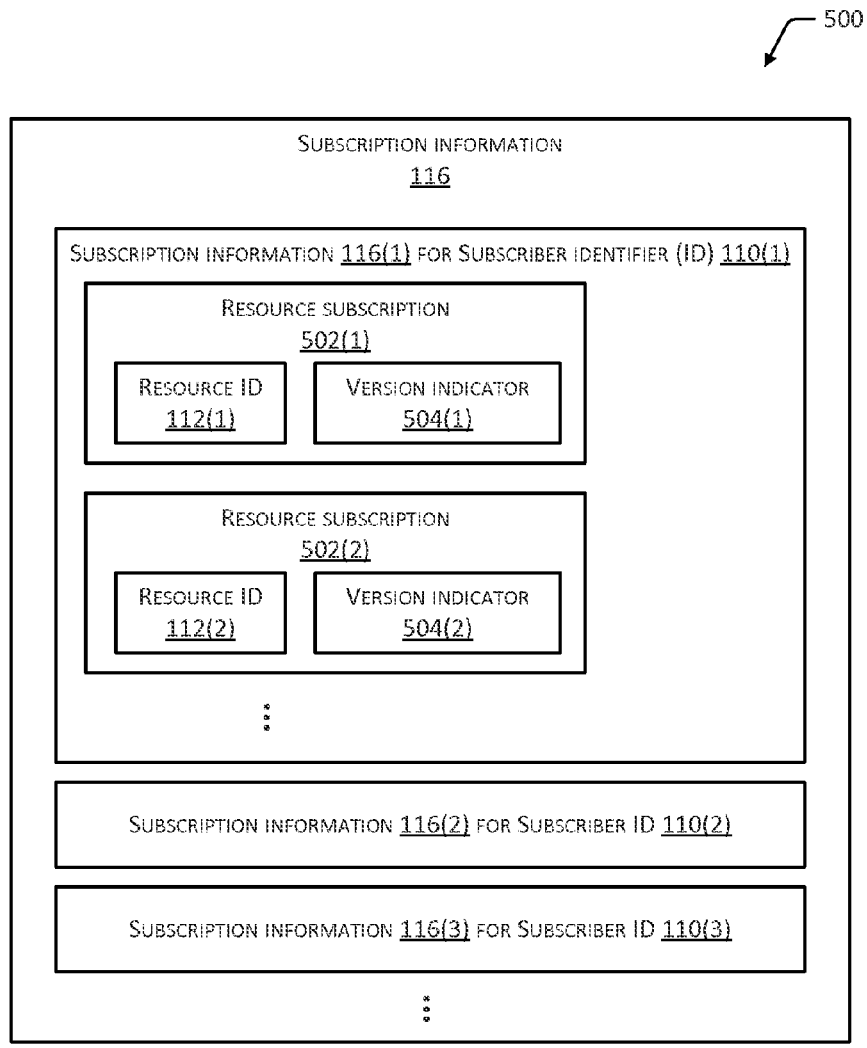
FIG. 5 depicts an example schematic of subscription information that may be employed to determine subscribed resources associated with a subscriber identifier.

FIG. 5 depicts an example schematic 500 showing a data format of the subscription information 116 that may be employed to determine the subscribed resources that are associated with a subscriber identifier 116. The subscription information 116 may be configured as a table, a list, a tree, or any other type of data structure, or as unstructured data. As shown in the example of FIG. 5, the subscription information 116 may include one or more resource subscriptions 502 that are associated with a subscriber ID 110. Each resource subscription 502 may include a resource ID 112 that identifies or distinguishes a particular resource previously sent to the user device 102 associated with the subscriber ID 110. Each resource subscription 502 may also include a version indicator 504 that describes which version of the resource was last sent to the user device 102. The version indicator 504 may include a date/time stamp corresponding to a date and time when the resource was last modified or updated. Alternatively, the version indicator 504 may include a version number, a watermark, a textual description of the version, or any other information that describes the version of the resource.

The subscription information 116 may be stored in memory on the resource server device 104, or externally to the resource server device 104. In some implementations, the subscription information 116 associated with each subscriber ID 110 may be stored separately. Alternatively, the subscription information 116 for some or all subscriber IDs 110 may be stored in the same memory segments, but may be logically separated according to subscriber ID 110. The subscription information 116 may incorporate one or more of the subscriber ID 110, resource ID 112, or the version indicator 504 as a searchable key value or data attribute. Such key values or data attributes may enable the resource subscription module 114 to search the subscription information 116 for the one or more resource subscriptions 502 corresponding to a subscriber ID 110, or perform other searches of the subscription information 116.

Figure 6:
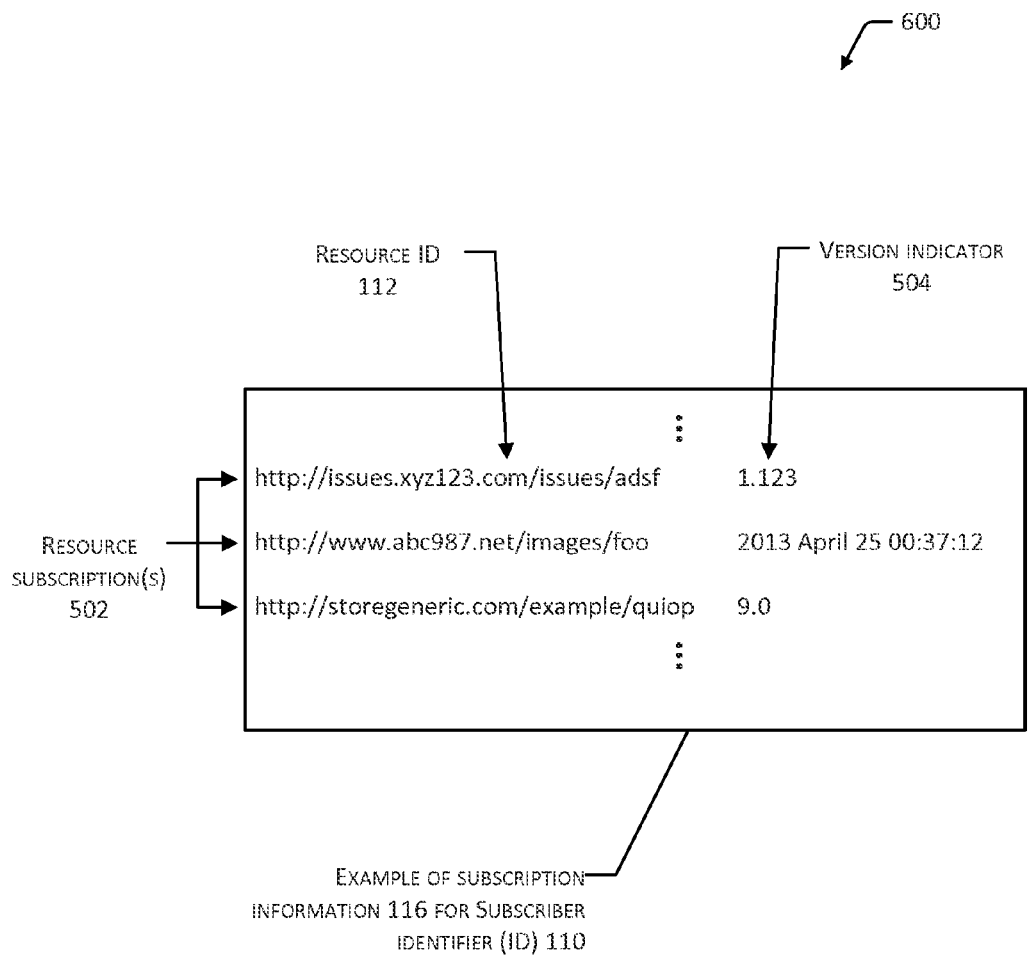
FIG. 6 depicts an example of the subscription information, describing one or more subscribed resources and versions of each of the subscribed resources.

FIG. 6 depicts an example 600 of the subscription information 116, describing one or more subscribed resources and versions for each of the subscribed resources associated with a subscriber ID 110. In this example, the subscription information 116 includes at least three resource subscription(s) 502. Each of the resource subscriptions 502 includes the resource ID 112 that identifies or distinguishes the subscribed resource. In this example, the resource IDs 112 are URLs, such as "http://issues.xyz123.com/issues/adsf". Each of the resource subscriptions 502 also includes the version indicator 504. This example illustrates implementations in which the version indicator 504 is a date/time stamp or a version number. Implementations also support other types of version indicators 504, such as a watermark or a textual description indicating the version.

FIG. 7 depicts an example 700 of an incrementally updated resource that may be provided by the resource server device 104 to the user device 102. As shown in FIG. 7, the initial version of the resource 124 may be updated through the application of an incremental resource update 122. In this example, the incremental resource update 122 includes deletions indicated by strikethroughs, and additions indicated by underscores. The incremental resource update 122 also includes a move of text from one location to another location in the resource, as indicated by a double strikethrough for the original location and a double underline for the new location. Through one or more operations 702 applying the update(s) to the resource, an updated version of the resource 204 may be generated. Such operation(s) 702 may be performed on the user device 102, in implementations where the user device 102 is sent the incremental resource update(s) 122.

In some implementations, the resource server device 104 may combine the incremental resource update(s) 122 with a corresponding resource 120 to generate an updated version of the resource 204. The resource server device 104 may then send the updated version of the resource 204 to the user device 102 in response to the request for resource updates 126. In such implementations, the operation(s) 702 may be performed by the resource subscription module 114 or by another module or application executing on the resource server device 104.

Figure 8:
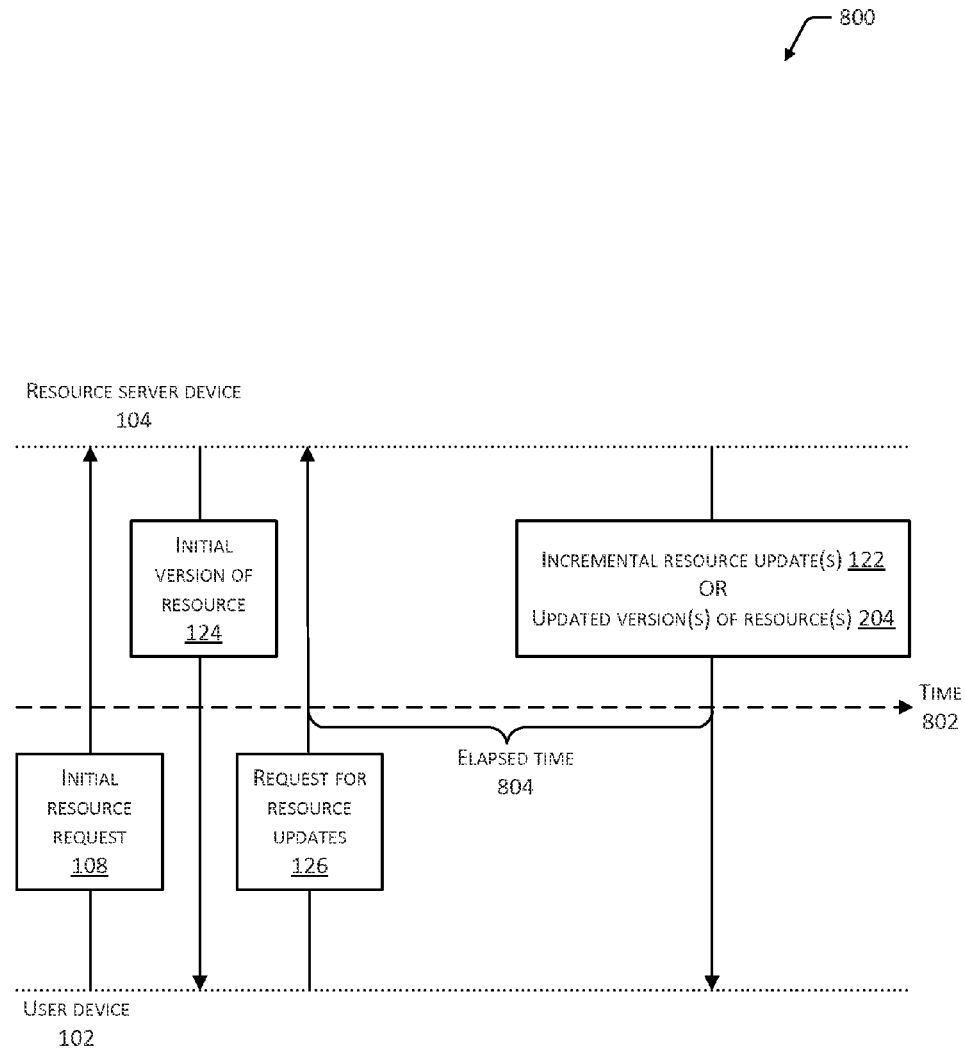
FIG. 8 depicts a diagram showing an example timing for the sending and receiving of the initial resource request, the initial version of the resource, the request for resource updates, and the incremental resource update(s) or the updated version(s) of the resource(s).

FIG. 8 depicts a diagram 800 showing example timings for the sending and receiving of the initial resource request 108, the initial version of the resource 124, the request for resource updates 126, and either the incremental resource update(s) 122 or the updated version(s) of the resource(s) 204. In the example of FIG. 8, the timings of the various communications between the user device 102 and the resource server device 104 are indicated along an axis corresponding to time 802, with time 802 increasing from left to right along the axis.

The initial resource request 108 may be sent from the user device 102 to the resource server device 104, and the resource server device 104 may send the initial version of the resource 124 to the user device 102, as described herein. In some cases, the time interval between the sending of the initial resource request 108 and the receiving of the initial version of the resource 124 at the user device 102 may depend at least in part on a speed or latency of the network connection between the user device 102 and the resource server device 104, or on a latency of retrieving the initial version of the resource 124 from the resource datastore 118. After receiving the initial version of the resource 124 (e.g., within 1 second), the user device 102 may send the request for resource updates 126 to the resource server device 102. As described further herein, the request for resource updates 126 may remain open as an open request or open poll, requesting information regarding any updates made to the initial version of the resource 124.

In some cases, an elapsed time 804 may pass between the sending of the request for resource updates 126 and the receipt of update information at the user device 102. As described further herein, the update information may include the incremental resource update(s) 122 in implementations corresponding to FIGS. 1 and 10. The update information may also include the updated version(s) of the resource(s) 204 in implementations corresponding to FIGS. 2 and 11. In some cases, the elapsed time 804 may be based at least partly on the amount of time that passes before one or more updates are made (e.g., by users) to the initial version of the resource 124 stored in the resource datastore 118. The elapsed time 804 may also depend at least partly on a frequency at which the resource subscription module 114 checks for updates made to the resources 120 stored in the resource datastore 118. In some cases, the elapsed time 804 may depend at least partly on a latency to retrieve and process updates made to the resources 120, or a speed or latency of the network connection between the user device 102 and the resource server device 104. As described further with reference to FIGS. 10 and 11, the request for resource updates 126 may be subject to a timeout or time-to-live (TTL) parameter. Accordingly, if the elapsed time 804 is greater than the predetermined timeout or TTL parameter, update information may not be sent to the user device 102. In such cases, the user device 102 may resend the initial resource request 108 to receive the initial version of the resource 124.

Figure 9:
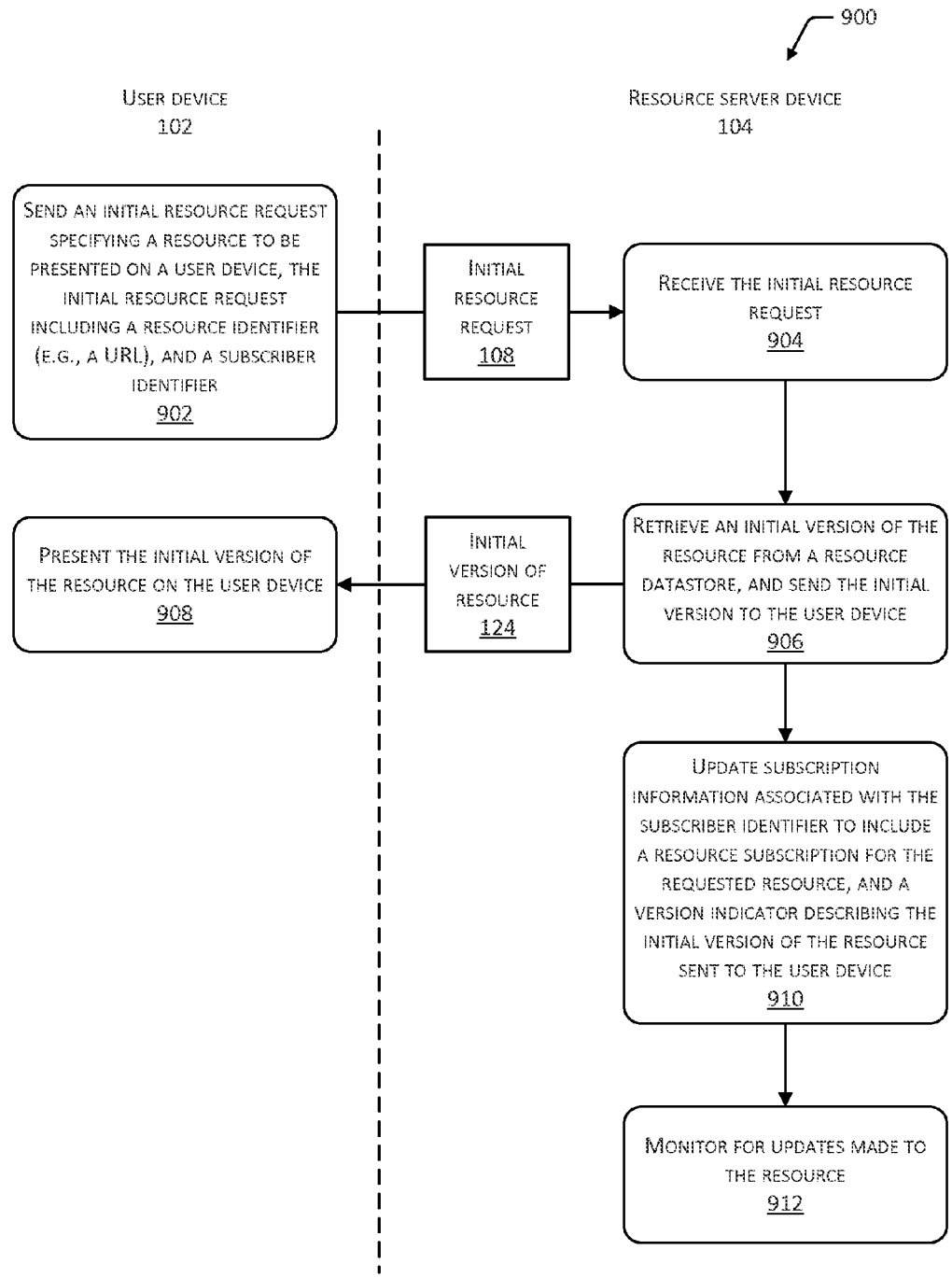
FIG. 9 depicts a flow diagram of a process for receiving an initial request for a resource, providing an initial version of the resource, and updating subscription information to include a subscription to the resource.

FIG. 9 depicts a flow diagram 900 of a process for receiving the initial resource request 108, providing the initial version of the resource 124, and updating the subscription information 116 to include a resource subscription 502 corresponding to the subscribed resource sent to the user device 102. The process includes operations that may be performed by the resource presentation module 106 or another module of the user device 102. The process also includes operations that may be performed by the resource subscription module 114 or another module of the resource server device 104.

At 902, an initial resource request 108 is generated on the user device 102, and sent to the resource server device 104. The initial resource request 108 may specify a resource to be presented on the user device 102 through a web application or through another type of application. In some implementations, the initial resource request 108 may specify the requested resource by including a resource ID 112. For example, the initial resource request 108 may include a URL that distinguishes or identifies the requested resource. The initial resource request may also include a subscriber ID 110. As described above, the subscriber ID 110 may uniquely identify or otherwise correspond to a communication session between the user device 102 and the resource server device 104. For example, the subscriber ID 110 may include an HTTP session identifier that is unique to an HTTP session. Alternatively, the subscriber ID 110 may identify the user device 102, or a user of the user device 102. In some implementations, the initial resource request 108 may be an HTTP request, such as an HTTP GET. The subscriber ID 110 may be incorporated into the initial resource request 108 as a parameter, a header, a cookie, or via some other data format.

At 904, the initial resource request 108 is received at the resource server device 104. In some implementations, the resource server device 104 may determine whether the requested resource is available from the resource datastore 118. If not, the resource server device 104 may respond to the initial resource request 108 with a message notifying the user device 102 that the requested resource is not found or not available.

At 906, an initial version of the resource 124 is retrieved from the resource datastore 118 and sent to the user device 102. As described above, the initial version of the resource 124 may be a current version of a resource 120 that is current during a time period when the initial resource request 108 is received and processed by the resource server device 104. At 908, the initial version of the resource 124 may be presented on the user device 102.

At 910, the subscription information 116 may be updated to include a resource subscription 502 that identifies the initial version of the resource 124 sent to the user device 102. As described above with reference to FIG. 5, the resource subscription 502 may be associated with the subscriber ID 110 in the subscription information 116. The resource subscription 502 may include a resource ID 112 that distinguishes or identifies the resource, and a version indicator 504 that describes the initial version of the resource 124 sent to the user device 102. For example, if the initial version of the resource 124 sent to the user device 102 is version 1.0, the version indicator 504 may be "1.0".

At 912, the process may monitor for updates made to the initial version of the resource 124, and provide any updates to the user device 102. Providing updates is described further with reference to FIGS. 10 and 11.

Figure 10:
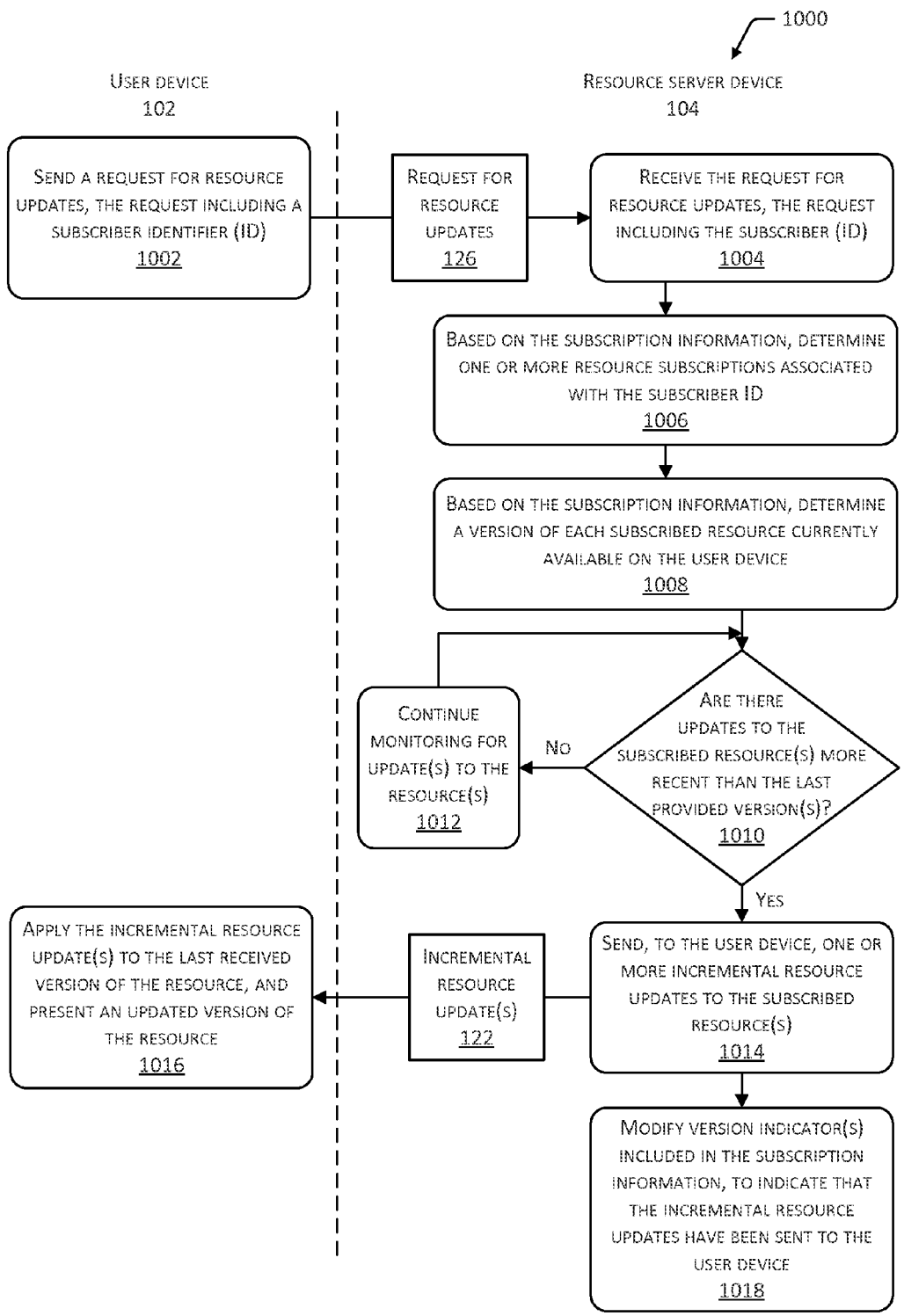
FIG. 10 depicts a flow diagram of a process for receiving a request for updates to subscribed resources, and providing incremental resource updates in response to the request for updates.

FIG. 10 depicts a flow diagram 1000 of a process for receiving the request for resource updates 126, and providing one or more incremental resource updates 122 in response to the request for resource updates 126 as described with reference to FIG. 1. The process includes operations that may be performed by the resource presentation module 106 or another module of the user device 102. The process also includes operations that may be performed by the resource subscription module 114 or another module of the resource server device 104. The communications described with regard to FIG. 10 between the user device 102 and the resource server device 104 may be performed during a same communication session as the communications described with regard to FIG. 9. The communications described with regard to FIGS. 9 and 10 may occur over a same connection or over different connections.

At 1002, a request for resource updates 126 is generated at the user device 102 and sent to the resource server device 104. The request for resource updates 126 may include the subscriber ID 110 that identifies or otherwise corresponds to a communication session between the user device 102 and the resource server device 104. Alternatively, the subscriber ID 110 may identify the user device 102 or a user. In some implementations, the request for resource updates 126 is a request by the user device 102 for any updates that have been made to any of its subscribed resource(s) since the last received versions of such resources. However, the request for resource updates 126 may not include any information such as resource IDs 112 that particularly identify the subscribed resources, and may provide the subscriber ID 110 to enable the resource server device 104 to determine the subscribed resources. In some implementations, the request for resource updates 126 is an HTTP request, such as an HTTP GET. As described above, the request for resource updates 126 may include a URL designated by the resource server device 104 as a URL for requesting updates. The request for resource updates 126 may incorporate the subscriber ID 110 as a parameter, a header, a cookie, or via some other data format.

At 1004, the request for resource updates 126 is received by the resource server device 104. At 1006, one or more resource subscriptions 502 may be identified as associated with the subscriber ID 110 included in the request for resource updates 126. The resource subscription(s) 502 may be determined based on the subscription information 116 associated with the subscriber ID 110. For example, the resource subscription(s) 502 may be determined by employing the subscriber ID 110 as a key value or data attribute in a query to or a search of the subscription information 116. If there is no subscription information 116 associated with the subscriber ID 110, the resource server device 104 may respond to the request for resource updates 126 with a notification that the subscriber ID 110 is unknown. Such a notification may prompt the user device 102 to resend the initial resource request(s) 108 and thus enable the resource server device 104 to create subscription information 116 corresponding to the subscriber ID 110.

In some implementations, the subscription information 116 for a particular subscriber ID 110 may be subject to a timeout or TTL parameter. On receiving the request for resource updates 126, the resource subscription module 114 or another module may determine how much time has elapsed since the subscription information 116 was created for the subscriber ID 110. If the elapsed time is greater than a timeout or TTL parameter (e.g., 5, 10, or 15 minutes), the various resource subscription(s) 502 associated with the subscriber ID 110 may be removed from the subscription information 116, and the user device 102 may be notified to resend the initial resource request(s) 108. Implementations may employ a timeout or TTL parameter of any duration, and the parameter may be adjustable based on performance considerations, available storage space on the resource server device 104, or other considerations. In some implementations, a process may periodically execute on the resource server device 104 to remove any subscription information 116 that is older than the timeout or TTL parameter.

At 1008, the subscription information 116 is employed to determine which version of each subscribed resource was last sent to the user device 102 and is therefore currently available on the user device 102. As described with reference to FIG. 5, the version currently on the user device 102 may be indicated by the version indicator 504 included in the resource subscription 502 for each subscribed resource.

At 1010, a determination is made whether any updates have been made to any of the subscribed resources since the last version(s) provided to the user device 102. In some implementations, this determination may be based on comparing the version indicator(s) 504 in the subscription information 116 to version information associated with the incremental resource update(s) 122 stored in the resource datastore 118.

If no recent updates are found at 1010, the process may proceed to 1012 and continue monitoring for update(s) to the subscribed resource(s), looping back to 1010 to determine whether updates have been made to one or more of the resources 120. In some implementations, the monitoring for update(s) may employ busy-wait polling, in which the resource subscription module 114 periodically polls the resource datastore 118 at regular time intervals (e.g., every 60 seconds) to determine whether any updates to the subscribed resource(s) have been stored in the resource datastore 118. At 1010, if any updates are found that are more recent than the last version(s) provided to the user device 102, the process may proceed to 1014.

At 1014, the incremental resource update(s) 122 for one or more subscribed resources may be sent to the user device 102. At 1016, the user device 102 receives the incremental resource update(s) 122 and applies the incremental resource update(s) 122 to the last received version(s) of the corresponding subscribed resource(s). In some cases, the last received version(s) may be the initial version(s) of the resource(s) 124. Alternatively, one or more updates may have been previously applied to the initial version(s), such that the last received version(s) are updated version(s). The user device 102 may generate a current version of each resource by combining the incremental resource update(s) 122 with the last received version of each resource, as described with reference to FIG. 7. The user device 102 may then present the current version of each resource to the user.

At 1018, the version indicator(s) 504 included in the subscription information 116 for the subscribed resources may be modified to indicate that the incremental resource update(s) 122 have been sent to the user device 102. In this way, the subscription information 116 may indicate the version of each subscribed resource that is currently available on the user device 102.

Figure 11:
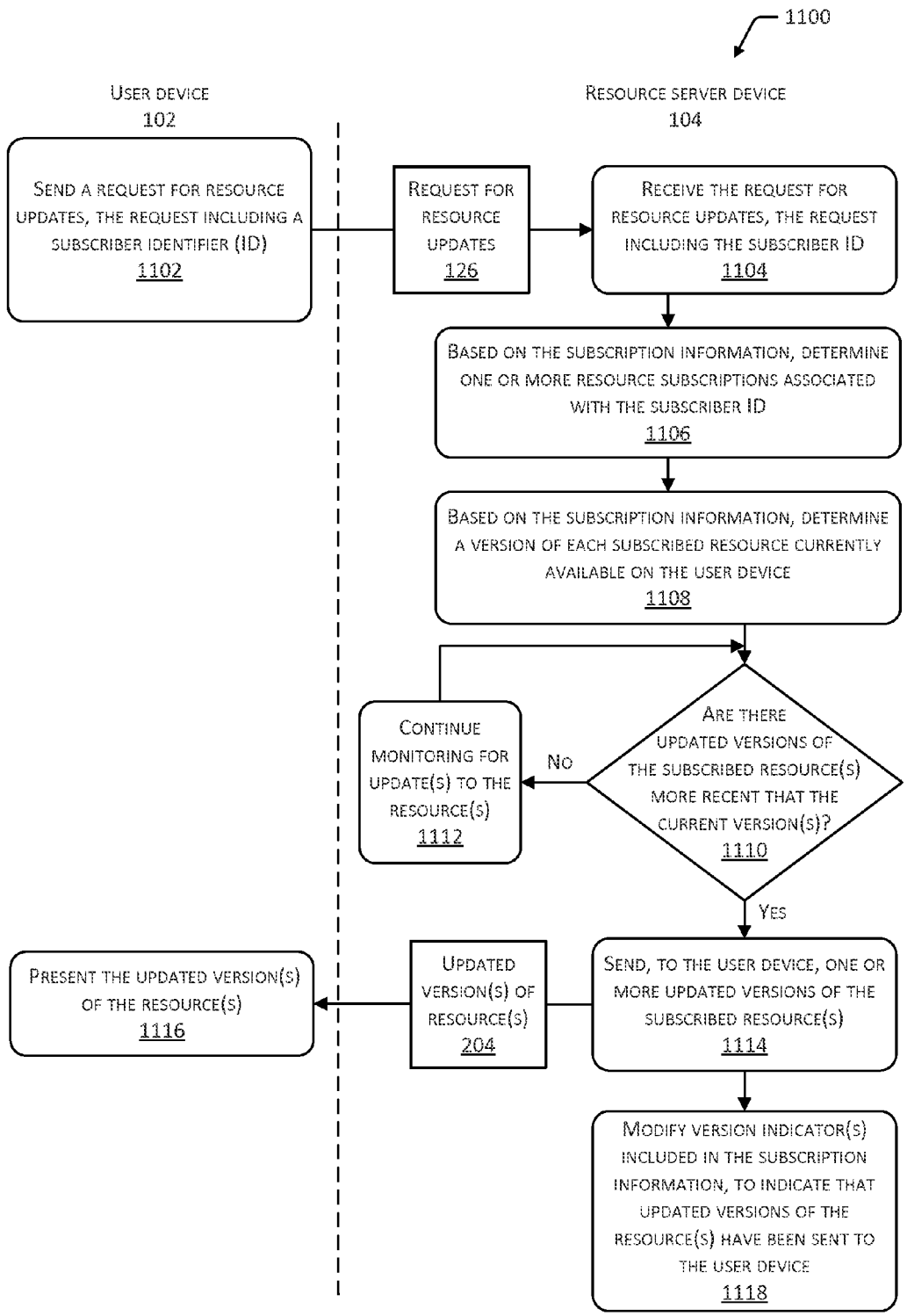
FIG. 11 depicts a flow diagram of a process for receiving a request for updates to subscribed resources, and providing updated versions of the subscribed resources in response to the request for updates.

FIG. 11 depicts a flow diagram 1100 of a process for receiving the request for resource updates 126, and providing updated version(s) of the resource(s) 204 in response to the request for resource updates 126 as described with reference to FIG. 2. The process includes operations that may be performed by the resource presentation module 106 or another module of the user device 102. The process also includes operations that may be performed by the resource subscription module 114 or another module of the resource server device 104. The communications described with regard to FIG. 11 between the user device 102 and the resource server device 104 may be performed during a same communication session as the communications described with regard to FIG. 9. The communications described with regard to FIGS. 9 and 11 may occur over a same connection or over different connections.

FIG. 11 illustrates implementations in which the updated version(s) of the resource(s) 204 are sent to the user device 102 from the resource server device 104 as illustrated in FIG. 2, instead of sending the incremental resource update(s) 122 as illustrated in FIGS. 1 and 10. The operations of 1102, 1104, 1106, and 1108 may proceed similarly as described above with reference to operations 1002, 1004, 1006, and 1008 respectively.

At 1110, a determination is made whether any updated versions of the subscribed resource(s) are available, which are more recent than the last version(s) sent to the user device 102. In some implementations, this determination may be based on comparing the version indicator(s) 504 in the subscription information 116 to version information associated with the resource(s) 120 stored in the resource datastore 118. Alternatively, the determination may be based on comparing the version indicator(s) 504 in the subscription information 116 to version information included in the resource update information 202.

If no such updates are found at 1110, the process may proceed to 1112 and continue monitoring for update(s) to the subscribed resource(s), looping back to 1110 to determine whether updates have been made to one or more of the resources 120. In some implementations, the monitoring for update(s) may employ busy-wait polling as described above with reference to 912. If any updates are found that are more recent than the last version(s) provided to the user device 102, the process may proceed to 1114.

At 1114 the updated version(s) of the resource(s) 204, for one or more subscribed resources, may be sent to the user device 102. At 1116, the user device 102 receives the updated version(s) of the resource(s) 204 and presents the updated version(s) of the resource(s) 204.

At 1118, the version indicator(s) 504 included in the subscription information 116 for the subscribed resources may be modified to indicate that the updated version(s) of the resource(s) 204 have been sent to the user device 102. In this way, the subscription information 116 may indicate which version of each subscribed resource is currently available on the user device 102.

In some implementations, at least one version of each subscribed resource may be stored or cached in memory on the user device 102. Such caching may enable the resource(s) to be presented on the user device 102 during a subsequent communication session with the resource server device 104, prior to the re-execution of the processes of FIGS. 9-11. Moreover, implementations support the viewing of resource(s) across multiple user devices 102 that may be associated with a same communication session.

Those having ordinary skill in the art will readily recognize that certain steps or operations illustrated in the figures above can be eliminated, combined, subdivided, executed in parallel, or taken in an alternate order. Moreover, the methods described above may be implemented as one or more software programs for a computer system and are encoded in one or more computer-readable storage media as instructions executable on one or more processors.

Separate instances of these programs may be executed on or distributed across separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art and it is intended that the present disclosure encompass such changes and modifications that fall within the scope of the appended claims.

What is claimed is:

1. A computer-implemented method, comprising:
during a communication session with a user device, receiving an initial request for a resource to be presented on the user device, the initial request including:
a resource identifier that distinguishes the resource; and
a subscriber identifier corresponding to the communication session;
accessing subscription information associated with the subscriber identifier, the subscription information comprising one or more resource subscriptions describing one or more resources subscribed to by the user device during the communication session;
sending, to the user device, an initial version of the resource;
updating the subscription information to include a resource subscription for the resource;
receiving, from the user device, a request for updates that includes the subscriber identifier;
determining one or more resource subscriptions corresponding to the subscriber identifier included in the request for updates, based on the subscription information;
determining one or more updates to the initial version of the resource, the one or more updates made since a time corresponding to the initial request for the resource; and
in response to the request for updates, sending the one or more updates to the user device.

2. The method of claim 1, wherein each of the one more resource subscriptions includes:
the resource identifier that identifies the resource; and
a version indicator describing a version of the resource currently available at the user device; and
wherein the updating of the subscription information further comprises modifying the version indicator of the resource subscription for the resource, to describe the initial version of the resource.

3. The method of claim 1, wherein the initial request and the request for updates comply with Hypertext Transfer Protocol (HTTP).

4. The method of claim 3, wherein one more of the initial request or the request for updates include the subscriber identifier in one or more of:
a HTTP header;
a HTTP payload;
a HTTP parameter; or
a HTTP cookie.

5. A system, comprising:
a memory, storing computer-executable instructions; and
a processor in communication with the memory, the processor configured to execute the computer-executable instructions that cause the processor to:
receive, from a user device, a request for updates that includes a subscriber identifier;
access subscription information stored in the memory, the subscription information associated with the subscriber identifier, the subscription information comprising at least one resource subscription describing:
a resource identifier that distinguishes a subscribed resource previously sent to the user device; and
a version indicator that describes a version of the subscribed resource previously sent to the user device; and
based on a determination that one or more updates have been applied to the subscribed resource since the version of the subscribed resource was previously sent to the user device, send update information to the user device, the update information describing the one or more updates to the subscribed resource.

6. The system of claim 5, wherein the processor is further configured to:
modify the version indicator included in the at least one resource subscription for the subscribed resource, to indicate that the update information has been sent to the user device.

7. The system of claim 5, wherein the update information includes an updated version of the subscribed resource.

8. The system of claim 5, wherein:
the update information includes the one or more updates; and
each of the one or more updates indicates a difference between the version of the subscribed resource previously sent to the user device and a subsequent version of the subscribed resource.

9. The system of claim 5, wherein the subscriber identifier corresponds to a communication session with the user device.

10. The system of claim 9, wherein the communication session is a Hypertext Transfer Protocol (HTTP) session.

11. The system of claim 5, wherein:
the request for updates complies with HTTP; and
the request for updates includes the subscriber identifier in one or more of:
a HTTP header;
a HTTP payload;
a HTTP parameter; or
a HTTP cookie.

12. The system of claim 11, wherein the resource identifier includes a Uniform Resource Locator (URL) corresponding to the subscribed resource.

13. The system of claim 5, wherein the subscribed resource includes at least a portion of a document that is presentable within a web browser executing on the user device.

14. One or more non-transitory computer-readable media storing instructions which, when executed by a processor, instruct the processor to perform actions comprising:
receiving, from a user device, a request for updates that includes a subscriber identifier;
accessing subscription information stored in a memory that is in communication with the processor, the subscription information associated with the subscriber identifier, the subscription information comprising at least one resource subscription that identifies a subscribed resource previously sent to the user device; and
send update information to the user device based at least partly on a determination that one or more updates have been made to the subscribed resource since an initial version of the subscribed resource was sent to the user device, the update information describing the one or more updates to the subscribed resource.

15. The one or more non-transitory computer-readable media of claim 14, wherein:
the at least one resource subscription further includes a version indicator describing a version of the subscribed resource previously sent to the user device; and
the actions further comprise modifying the version indicator to describe the initial version of the subscribed resource.

16. The one or more non-transitory computer-readable media of claim 15, wherein the version indicator includes one or more of a timestamp, a version number, or a watermark that describes the version of the subscribed resource.

17. The one or more non-transitory computer-readable media of claim 14, wherein the update information includes an updated version of the subscribed resource.

18. The one or more non-transitory computer-readable media of claim 14, wherein:
   the update information includes the one or more updates; and
   each of the one or more updates indicates a difference between the initial version of the subscribed resource and a subsequent version of the subscribed resource.

19. The one or more non-transitory computer-readable media of claim 14, the actions further comprising:
   prior to receiving the request for updates, receiving an initial request for a resource to be presented on the user device, the initial request including:
      a resource identifier that distinguishes the resource; and
      the subscriber identifier;
   updating the subscription information to include a resource subscription indicating that the resource is the subscribed resource; and
   sending, to the user device, the initial version of the subscribed resource.

20. The one or more non-transitory computer-readable media of claim 19, wherein the resource identifier includes a Uniform Resource Locator (URL) corresponding to the resource.

* * * * *